REMOVABLE EXPANSION BRACELET LINK
Original Filed Feb. 13, 1957 2 Sheets-Sheet 1
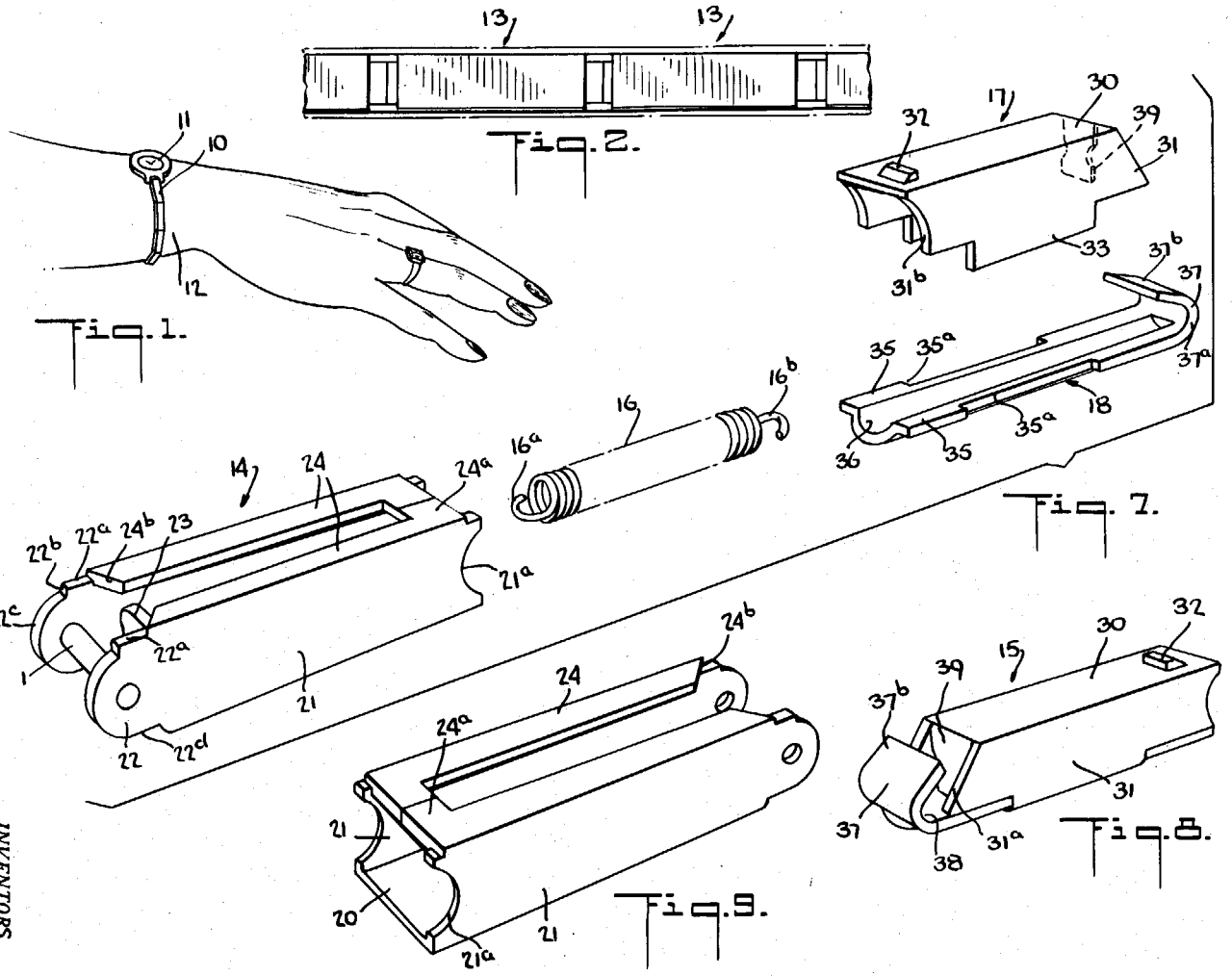
INVENTORS
LOUIS POMPEO
ANDREW SZEGLIN
BY
Mock & Blum
ATTORNEYS REMOVABLE EXPANSION BRACELET LINK
Original Filed Feb. 13, 1957 2 Sheets-Sheet 2
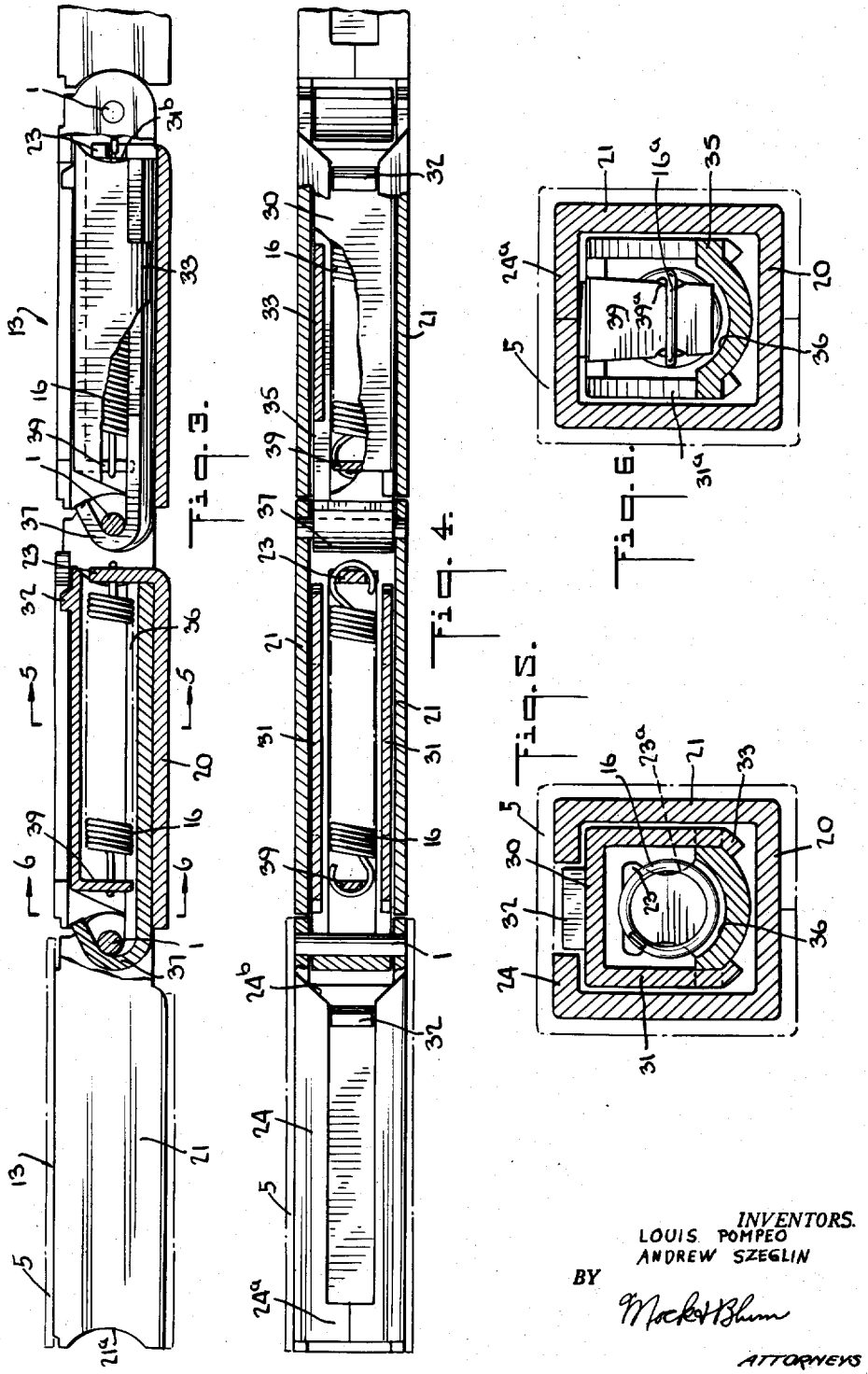
INVENTORS.
LOUIS POMPEO
ANDREW SZEGLIN
BY
Mock & Blum
ATTORNEYS United States Patent Office Re. 25,014
Reissued Aug. 1, 1961

25,014

REMOVABLE EXPANSION BRACELET LINK

Louis Pompeo, Bloomfield, N.J., and Andrew Szeglin, Hempstead, N.Y., assignors to Duchess Jewelry Mfg. Corporation, Hoboken, N.J., a corporation of New York Original No. 2,848,864, dated Aug. 26, 1958, Ser. No. 639,943, Feb. 13, 1957. Application for reissue Mar. 7, 1960, Ser. No. 13,410
2 Claims. (Cl. 59—79)

Matter enclosed in heavy brackets [ ] appears in the original patent but forms no part of this reissue specification; matter printed in italics indicates the additions made by reissue.

This invention relates to improvements in expansion bracelets for watches and the like.

In particular, the invention relates to improvements in bracelets of the type having expansible links each comprising telescopic male and female shells.

In accordance with a preferred embodiment of this invention, we provide an expansible link having an elongated, hollow open-ended female shell of generally rectangular shape. A pair of side ears protrude forwardly of opposed side walls of the female shell and are connected by a transverse pivot pin. A lug protrudes from one of the walls of the female shell into the interior space thereof, adjacent the front end thereof. In this preferred embodiment the [female] *male* shell is also of generally rectangular shape and is also hollow and elongated. Said male shell is provided externally thereof, and at the rear end thereof, with a hook-like tongue. A lug extends from one of the side walls of the male shell into the interior space thereof, adjacent the rear end thereof.

In the assembled link, a coil spring is located slidably within the interior space of the male shell, said coil spring having end hooks which engage respectively with the aforesaid lugs, so as to resist extension of the link.

The links may be assembled together by engaging the rear hook-like tongue of one link with the front pivot pin of the next link.

An important object of this invention is to provide a construction of the above-described type, wherein the links can be assembled and disassembled without the need for using tools.

Another important object of this invention is to provide a construction of the above-described type, wherein, within the limits of normal use of the watch band, the more it is stretched the less likely it will be that the links will become separated from each other.

In accordance with said preferred embodiment of this invention, this and other objects of the invention are accomplished, in part, by making the male shell from two pieces of metal, rather than of a unitary construction. The first member of the male shell is in the form of an elongated bottom plate or wall, with the rear end portion of the plate being bent upwardly and then forwardly to provide the aforesaid hook-like tongue. The second member of the male shell is of elongated, inverted channel shape and is open-ended, said channel member having tabs which may be bent appropriately to engage frictionally with the bottom closure plate. The rear edges of the side walls of the channel member of the male shell are upwardly forwardly inclined, their inclination being less than the inclination of the free end portion of the hook-like tongue.

The lateral pivot pin of one link fits frictionally between the extreme free end of the tongue and the inclined rear edges of the side walls of the channel member, and can be snapped past this point to a position wherein it is freely movable about its axis between the tongue and said inclined rear edges.

As will be apparent from the subsequent detailed description, the expansion links are oriented in the assembled watch bracelet so that the top openings between the tongues and the inclined rear edges of the respective male shells of the links are remote from the wrist when the watch bracelet is worn thereon. Accordingly, within normal conditions of use of the watch bracelet, the more that the watch bracelet is expanded, the more firmly the pivot pins are held against the lower portions of the respective tongues. In this construction, therefore, it is unnecessary to crimp the free ends of the holding tongues. It will be apparent that in this construction, use of tools to connect or separate the expansion links is completely eliminated.

Other objects and advantages of this invention will become apparent from the following description, in conjunction with the annexed drawing, in which a preferred embodiment of the invention is disclosed.

In the drawings,

FIG. 1 is a perspective view of a watch and watch-bracelet assembly as worn on the wrist, the bracelet being expansible and including removable links in accordance with this invention.

FIG. 2 is a fragmentary top plan view of the bracelet. For convenience, in this and in succeeding views, the conventional decorative outer shell over each link is shown in phantom in some instances and is not shown in other instances.

FIG. 3 is a fragmentary longitudinal vertical section of the bracelet.

FIG. 4 is a fragmentary longitudinal horizontal section of the bracelet.

FIG. 5 is a section on line 5—5 of FIG. 3.

FIG. 6 is a section on line 6—6 of FIG. 3.

FIG. 7 is an exploded perspective front view of the disassembled parts of one of the removable and expansible links in accordance with this invention.

FIG. 8 is a perspective rear view of the assembled male member of said removable and expansible link.

FIG. 9 is a perspective rear view of the female member of said removable and expansible link.

Upon reference to the drawing in detail, it will be noted that it shows a bracelet 10, which may optionally have its ends connected to a watch 11, and is thus shown worn on the wrist 12. Said bracelet 10 comprises a plurality of removable and expansible links 13. Optionally, only the end links at one or both end portions of bracelet 10 need be removable.

Each link 13 includes a hollow, longitudinally extending female member or shell 14; a hollow, longitudinally extending male member or shell 15 which is telescoped and axially slidable within female shell 14; a spring 16 connecting shells 14 and 15 and a conventional decorative cover shell 5.

Female shell 14 is formed from a blank of metal which is stamped and bent into open-ended channel shape. Said shell 14 has a rectangular bottom wall 20 and parallel, upstanding side walls 21. One end edge 21$^a$ of each side wall 21, which will be hereinafter referred to as the rear end thereof, is cut out to define a concave shape of said end edge 21$^a$. Said walls 21 extend to the rear edge of bottom wall 20.

Side walls 21 also extend to the front edge of bottom wall 20, but said side walls 21 have respective coplanar, integral ears 22 which extend forwardly of the front edge of wall 20. The detached peripheral edge of each ear 22 is generally convex in shape. However, the upper detached ear edge portion 22$^a$ is straight and steps downwardly at its front end, as shown at 22$^b$, to connect with an arcuate edge portion 22$^c$. This edge portion 22$^c$ is optionally approximately in the shape of a minor arc of a circle. The lower portion 22$^d$ of edge 22, which connects between edge portions 22[c] and wall 21, is substantially linear in shape and is located in the same general plane as the upper face of bottom wall 20.

A lateral pivot pin 1 extends between ears 22. The ends of pin 1 may be fixed in ears 22 in any suitable manner. Optionally, the ends of pin 1 extend frictionally and fixedly into appropriate recesses provided in the respective ears 22.

A lug 23 is integral with bottom wall 20 at the front edge thereof and extends vertically upwardly therefrom. The width of lug 23 is less than the distance between side walls 21. The upper end of lug 23 is spaced below the plane of the upper edges of side walls 21. As best shown in FIG. 5, the side edges of lug 23 are provided with concave cut-outs 23[a].

Female shell 14 also comprises a pair of top flanges 24 which are integral with the respective side walls 21 and which extend inwardly therefrom. Said flanges 24 are laterally spaced from each other, except that at the rear of the shell the said flanges 24 are provided with inwardly extending wings 24[a]. The inner edges of said wings 24[a] substantially abut each other. The front edges 24[b] of the respective flanges 24 are inclined outwardly forwardly as is clearly shown in FIGS. 7 and 9 and in other views. Said flanges 24 extend from the front ends of walls 21 to a point just short of the rear ends thereof. The upper faces of flanges 24 are located slightly above the level of the upper [wing] *ear* edge portions 22[a].

Male shell 15 is preferably formed from two parts, a channel member 17 and a bottom closure [member] *plate* 18. Channel member 17 is shown in FIG. 7 in its shape prior to assembly with the bottom closure plate 18. As shown in FIG. 7, channel member 17 comprises a top wall 30 and side walls 31. Wall 30 is rectangular in shape and is longitudinally elongated. Wall 30 is provided adjacent its front end with an upstanding boss 32 of reduced width. The rear edge 31[a] of each wall 31 is preferably downwardly rearwardly inclined and linear. The front edge 31[b] of each wall 31 is preferably downwardly rearwardly inclined and concave. A flange or tab 33 extends downwardly (in FIG. 7) from the lower edge of each side wall 31 and is of reduced length.

The bottom closure [member] *plate* 18 is of generally rectangular, longitudinally elongated shape. Said [member] *plate* 18 has flat, coplanar side portions 35 and a trough-like central portion 36. The trough-like portion 36 is coextensive in length with the side portions 35. Each side portion 35 of [member] *plate* 18 is provided intermediate its ends with a cut-out or notch 35[a] of the same length as flange or tab 33.

Closure [member] *plate* 18 also includes, at its rear end, an integral tongue or catch 37. This catch 37 is of the same width as the main portion of [member] *plate* 18. Catch 37 includes a lower portion 37[a], i.e., bight, which curves upwardly from the plane of plate side portions 35. Said catch 37 also includes a substantially planar upper portion 37[b], i.e., tip which is inclined upwardly forwardly from the upper end of catch portion 37[a]. It will be apparent from FIGS. 7 and 8, as well as other views, that the lower catch portion 37[a] is convex as viewed from the rear and concave as viewed from the front.

In the assembled condition of male shell [18] *15*, the lower edges of side walls 31 rest upon the respective upper faces of said portions 35, and tabs 33 extend downwardly through the respective [slots] *notches* or cut-outs 35[a]. The inner faces of walls 31 are spaced slightly outwardly of the side edges of trough 36. The tabs 33 are bent inwardly, as is best shown in FIG. 5, to underlie the lower face of trough 36, so as to hold the two parts frictionally together.

In the assembled shell 15, the front end of the lower face of each wall 31 is coextensive with the respective front end of closure [member] *plate* 18. Because of the inclination of the [side wall] *front* edges 31[b] *of the side walls,* the upper wall 30 protrudes slightly forwardly of closure [member] *plate* 18. Also in the assembled shell 15, catch 37 is located behind and spaced from the [side wall] *rear* edges 31[a] *of the side walls.* Preferably, as clearly shown in FIG. 8 and in other views, the inclination of the vertical of [wall] *the rear* edges 31[a] *of the side walls* is greater than the inclination to the vertical of [top] *upper* catch portion 37[b]. As a result, the space between the rear face of catch 37 and said edges 31[a], which space is hereinafter designated by the reference numeral 38, is of minimum length at the top of catch 37 and gradually increases to a maximum length at the approximate middle point of catch portion 37[a].

A lug 39 is integral with top wall 30 and extends downwardly from the rear edge thereof. The side edges of lug 39 are spaced inwardly from side walls 31. The lower edge of lug 39 is spaced above the level of bottom closure *plate* 18. The side edges of lug 39 are provided with concave notches 39[a], as is best shown in FIG. 6.

Spring 16 is a spirally wound coil spring. The end hooks 16[a] and 16[b] of spring 16 are preferably located in a common horizontal plane and preferably open to opposite sides of the spring. This is clearly shown in FIGS. 3, 4 and 7.

In the assembled link 13, the shell 15 fits fairly closely, but frictionally slidably within the inner space of shell 14. This is clearly shown in FIGS. 3–6. The boss 32 extends slidably between flanges 24. Boss 32 extends slidably between the inner edges of flanges 24, and wings 24[a] serve as a stop to limit rearward movement of boss 32 within the space between flanges 24, thereby preventing separation of the two shells 14 and 15. In the assembled link 13, spring 16 extends within the inner space of shell 15, and extends slidably into trough 36. Hook 16[a] extends around lug 23 and is caught within the notches 23[a] thereof. Hook 16[b] extends around lug 39 and engages within the notches 39[a] thereof. Accordingly, any longitudinal movement of the two shells 14 and 15 toward separated position is resisted by spring 16, which tends to return the parts toward their fully telescoped position. This telescoped position of shells 14 and 15 is clearly shown in FIGS. 3 and 4. In said telescoped position of the shells, the front of shell 15 is located rearwardly of lug 23. Catch 37 protrudes rearwardly of the rear end of shell 14.

The conventional cover shell 5 of link 13 is rectangular in cross-section and extends frictionally around shell 14. Shell 5 extends substantially the length of side walls 21, and ears 22 protrude forwardly of shell 5.

FIGS. 3 and 4 show the manner of assembly of successive links 13. As an important feature of the invention, such assembly may be effected without the use of tools. All that is necessary is that the pivot pin 1 of a first link 13 be inserted into the space 38 between the tungue 37 and inclined [wall] *rear* edges 31[a] *of the side walls* of a second link 13. Said pin 1 fits frictionally between the upper end of catch 37 and the inclined [walls] *edges* 31[a] and must be snapped from the top past this point, into the main portion of the space 38. As a result of the cylindrical shape of pin 1 and the convex shape of the lower catch portion 37[a], pin 1 is then freely turnable about its axis even when the links 13 are placed under tension as in FIG. 1.

In the assembly of links 13, the front ear [edges] *edge portions* 22[c] of one shell 14 are adjacent the rear [side wall] *end* edges 21[a] *of the side walls* of the next shell 14. As shown in FIG. 3, the curvature of these edges 22[c] and 21[a] conforms sufficiently to permit free articulation of the links.

As a further important feature of the invention, the top openings of each space 38 is remote from wrist 12 when the assembled band 10 and watch 11 is placed thereon. Accordingly, the greater the tension upon band 10, the more firmly pins 1 are respectively held against the *lower* catch portions 37[a]. It is impossible, therefore, for any of the links 13 to become disassembled during normal wearing of band 10. This makes it possible to rely merely upon the fact that pin 1 has to be snapped through the top opening of space 38 in assembly or disassembly of the links, to protect the band from disassembly during normal handling thereof, either when it is being worn or when it is not being worn. As a result, it is unnecessary to bend the tongues 37 with a tool after the links 13 have been assembled.

The two-piece construction of male shells 15 is extremely important in connection with the preferred orientation of catch 37 upon the wrist 12. For appearance, since shells 15 become somewhat exposed upon expansion of links 13, the upper wall 30 should be smooth and should be oriented as the outer or exposed wall of shell 15 when worn on the wrist. Accordingly, catch 37 should connect with the bottom wall of shell 15, in order to maintain the desired orientation of catch 37 upon the wrist. On the other hand, from the standpoints of economy and strength, the shells of link 13 should not be extruded or soldered, but should be stamped and bent from flat metal blanks.

If shell 15 were formed from a single blank, similar to element 17, which were bent to form a top wall, side walls and inturned bottom flanges serving as a bottom wall, it would not be practical to make catch 37 an integral extension of the bottom wall. It is the provision of the separate bottom [wall] *closure plate* 18, frictionally secured to the inverted channel member 17, which makes it practical to form catch 37 as an integral extension of the bottom wall. As a further advantage of the described construction, [tab] *lug* 39 can be simply an integral extension of top wall 30.

For simplicity of illustration, only removable links 13 have been shown. Also, the manner in which catch 37 is attached to the watch has not been shown, since this may be done in any conventional and well-known manner. It will be understood that in some instances it may be unnecessary for all of the links to be detachable. Thus, as one example, band 10 may be furnished in an initial average length which may include a plurality of fixed links and one or more removable links at either end of the band.

In this example, additional links may be provided separately. Thus, the retail jeweler can readily adjust the length of the band for individual use by merely subtracting or adding removable links without the need for tools. In thus adapting the conventional expansion band or bracelet, it is merely necessary that the end links of the series of non-removable links be respectively provided with the equivalent of catch 37 or the equivalent of pin 1, as the case may be.

While we have disclosed a preferred embodiment of our invention and have indicated various changes, omissions and additions which may be made therein, it will be apparent that various other changes, omissions and additions may be made in the invention without departing from the scope and spirit thereof.

We claim:

*1.* An expansion bracelet to be [worm] *worn* on the wrist, comprising a plurality of circumferentially extending expansion links, each said link comprising an open-ended, longitudinally elongated female shell presenting a bottom wall toward the wrist and a top wall remote from the wrist, an open-ended, longitudinally elongated male shell slidably and telescopically received within said female shell, and spring means coupling said shells and normally maintaining said link in contracted condition, said female shell having pin holding means extending forwardly of the main portion thereof, and having a laterally extending pivot pin held at its ends by said pin-holding means and spaced from the main portion of said female shell, said male shell having a bottom wall and having side walls with forwardly upwardly inclined rear edges, said male shell also having a catch which extends from its bottom wall rearwardly of its side walls, said catch being of general hook shape and being bent upwardly and then into upward forward inclination, the forwardly inclined portion of said catch being spaced from the rear edges of said side walls and converging toward same, the diameter of said pivot pin being greater than the distance between the upper end of the catch and the rear edges of said side walls and being less than the distance between the lower portion of the forwardly inclined portion of said catch and said inclined rear edges, said forwardly inclined portion of said catch being resiliently yieldable whereby the pivot pin of one link is frictionally slidable between the upper end of the catch and the inclined rear edges of the side walls of another link and is freely turnable within the space between the upper portion of the forwardly inclined portion of the catch and said inclined edges.

*2. An expansion bracelet as set forth in claim 1 wherein the male shell comprises two parts, one part being the bottom wall and the other including the side walls, and wherein means is provided joining said two parts to one another for common movement with respect to the female shell, the catch being integral with said bottom wall part.*

References Cited in the file of this patent
or the original patent

UNITED STATES PATENTS

| | | |
|---|---|---|
| 1,132,099 | King | Mar. 16, 1915 |
| 1,184,534 | Jolly | May 23, 1916 |
| 1,461,203 | Bauer et al. | July 10, 1923 |
| 1,603,385 | Gammell et al. | Oct. 19, 1926 |
| 1,644,487 | Person | Oct. 4, 1927 |
| 1,700,298 | Prestinari | Jan. 29, 1929 |
| 1,739,689 | Newman | Dec. 17, 1929 |
| 2,052,381 | Chernow | Aug. 25, 1936 |
| 2,358,739 | Schoeninger | Sept. 19, 1944 |
| 2,518,507 | Valcourt | Aug. 15, 1950 |
| 2,744,379 | Valcourt | May 8, 1956 |
| 2,956,395 | Rodriguez | Oct. 18, 1960 |